United States Patent [19] [11] 4,075,147
Thompson [45] Feb. 21, 1978

[54] POLYPROPYLENE/PELARGONATE DIVALENT METAL SALT

[75] Inventor: Donald F. Thompson, Elburn, Ill.

[73] Assignee: Standard Oil Company (Indiana), Chicago, Ill.

[21] Appl. No.: 734,321

[22] Filed: Oct. 20, 1976

[51] Int. Cl.² .................. C08K 5/56; C08L 23/12; C08L 23/14
[52] U.S. Cl. .................. 260/23 H; 260/45.75 R; 260/45.75 W; 260/45.85 R; 526/5
[58] Field of Search ...... 260/23 H, 45.85 R, 45.75 W, 260/45.75 R; 526/5

[56] References Cited

U.S. PATENT DOCUMENTS 2,984,634  5/1961  Caldwell et al. .................. 260/23 H
2,985,617  5/1961  Salyer et al. ..................... 260/23 H
3,238,163  3/1966  O'Neill et al. .................... 260/23 H
3,335,104  8/1967  Kopacki et al. ................... 260/23 H
3,367,926  2/1968  Voeks .............................. 526/5
3,622,530  11/1971 Branchesi ......................... 260/23 H

FOREIGN PATENT DOCUMENTS 897,843  4/1972  Canada ............................ 260/23 H
716,151  8/1965  Canada ............................ 260/23 H
982,208  2/1965  United Kingdom .......... 260/45.85 R Primary Examiner—Ronald W. Griffin
Attorney, Agent, or Firm—William H. Magidson; Arthur G. Gilkes; William T. McClain

[57] ABSTRACT

Composition comprising resinous polymer of propylene and divalent metal salt of pelargonic acid.

8 Claims, No Drawings

POLYPROPYLENE/PELARGONATE DIVALENT METAL SALT

This invention relates to resinous polymers of propylene containing a pelargonic salt of a divalent metal. More particularly, this invention relates to the production of films of resinous polymers of propylene containig calcium pelargonate.

Resinous polymers of olefins produced with various metal halide catalysts are generally stabilized with alkaline materials which function as scavengers for residual halides in the polymer composition. While numerous compounds have been suggested, such as any stabilizer for resinous polymers of vinyl chloride (see Salyar U.S. Pat. 2,985,617), calcium stearate is often used. For the most part these stabilizers are quite effective scavengers.

Resinous polymers of propylene are used to prepare slit film ribbon fibers, which are subsequently woven into fabrics useful for producing industrial bags and carpet backings. In these large volume uses, the ribbon films are produced by extruding a two to five foot wide web at high speed into a water quench bath, drying the wet film, slitting the dry film into 40 to 500 mil wide ribbons, drawing the ribbons in an oven, gathering the wide ribbons and winding each ribbon on a separate spool. On a commercial basis, it is desirable to operate at the maximum speed attainable on the extrusion equipment. However, the maximum production rate is dependent upon the water retention properties of the resinous polymer of propylene films. The more hygroscopic the ribbon film, the greater the tendency of the ribbon to retain water and subsequently break during drawing. Even when the ribbon film does not break, water carry-over can cause uneven film orientation, reduced tensile strength and other undesirable properties. To avoid this, the web must be run at a slower speed in the drawing stage of the production line. Accordingly, it is desirable to provide resinous polymers of propylene compositions having relatively low water carry-over properties.

The general object of this invention is to provide resinous polymers of propylene having improved water carry-over properties. Another object of this invention is to provide a process of producing resinous polymer of propylene films (including ribbon films) having improved water carry-over properties.

I have now found that the water carry-over properties of resinous polymer of propylene film is directly dependent upon the halogen scavenger in the resinous polymer of propylene. I have found that by employing a pelargonic acid salt of a divalent metal in place of calcium stearate, it is possible to markedly increase the casting speed in the production of resinous polymer of propylene slit film fibers. Further, these pelargonate salts are more effective halide scavengers than calcium stearate and provide corrosion protection to the resinous polymer of propylene. Other things being equal, approximately half as much calcium pelargonate provides the same corrosion resistance.

Apparently the divalent salt of pelargonic acid is unique in the sense that it melts at a temperature very close to the melting point of homopolymeric crystalline polypropylene and does not have any deleterious effect on the process. While various other salts, such as calcium azelate, calcium benzoate, calcium carbonate, and calcium phosphate are approximately as effective in reducing water carry-over, these salts melt in excess of 300° C., approximately 100° C. above the melting point of calcium pelargonate. Due to their higher melting point, there is a tendency for salt build-up in the extruder at the breaker plates and/or screen pack thereby necessitating more often shutdown of the extruder equipment. Attempts to use calcium octoate have been unnsuccessful due to an increase in pressure during the extrusion operation. This may be due to the liquid nature of the calcium octoate salt.

For purposes of this invention the "resinous polymer of propylene" includes polymers containing at least 75 percent by weight propylene such as substantially crystalline homopolymeric polypropylene, propyleneethylene block, random or multi-segment copolymers containing up to 25 percent by weight ethylene units in the polymers, etc.

The divalent metal salts of pelargonic acid useful in this invention include the alkaline earth metal salts such as barium pelargonate, calcium pelargonate, strontium pelargonate, etc.; zinc pelargonate, magnesium pelargonate, etc. These pelargonate salts can be used in a concentration of about 0.001 to 5 parts by weight, preferably 0.01 to 0.2 parts by weight, per each 100 parts by weight resinous polymer of propylene. In general, the lower the concentration of pelargonate salt, the better the water carry-over properties.

The compositions of this invention can be extruded into webs using a conventional plasticizing extruder equipped with a film die under conventional conditions of about 450° to 550° F. Films produced in this manner can be slit and further processed into ribbon fibers or film. Typically, the ribbon fibers are produced commercially by extruding 2 to 5 feet webs at high speed into a water quench bath, drying the wet film, slitting the dry film into 40 to 50 mil wide ribbon, orienting in an oven, gathering the ribbons and winding the ribbon fibers on separate spools.

If desired, various concentrates of pelargonate salt can be prepared and pelletized with resinous polymer of propylene. The pellets, prior to use are then mixed with pellets of resinous polymer of propylene and other additives, such as alkali metal bisulfate, thermoplastic amino polymer, silica, oleamide, stabilizers, and other materials used to produce resinous polymer of propylene ribbon films.

The following examples are merely illustrative.

EXAMPLE I

A series of resinous polymers of propylene were compounded with stabilizers and then processed in order to evaluate the water carry-over properties of the compositions under conditions similar to those encountered in the production of ribbon film fibers. In each case 99.79 parts of unstabilized homopolymeric polypropylene powder having a number average molecular weight of 110,000 and flow rate of 2 to 4, .03 parts by weight of the candidate halide scavenger, .1 parts by weight butylated hydroxytoluene, .05 parts by weight 1,3,5-tris(3,5-di-t-butyl-4-hydroxybenzyl)-s-triazine-2,4,6(1H,3H,5H)-trione and 0.3 parts by weight distearyl pentaerythritol diphosphite were drum tumbled for ¾ of an hour and pelletized in a 1¾ inch Prodex compounding extruder having a barrel temperature of about 450° F. equipped with a 4-hole ⅛ inch diameter spinnerette die at a die temperature of about 460° to 475° F. The extrudate was chopped into ⅛ inch long pellets and fed to a 1½ inch Sterling Fiber extruder having a barrel temperature of 475° F. and a die temperature of 475° F. The die was a 30 inch wide sheeting die having a 0.020 inch slit opening. The film was extruded into a quench bath having a temperature of about 95° to 105° F., conveyed vertically upward for a distance of 8 to 10 feet through a pair of nip rolls formed by a metal roll and a rubber roll. In each case the extruder was set to run at different speeds up to approximately 130 feet per minute. The extrusion speed was adjusted until the 30 inch wide sheet leaving the water bath had no droplets of water as the web emerged from the water. The break point of each composition was the maximum number of feet per minute at which no droplets of water appeared when the polypropylene web emerged from the water quench bath. The halide scavengers and break point of the various compositions appear below in Table I.

Table I

| Scavenger | Break Speed in Feet Per Minute |
|---|---|
| Sodium stearate | 44 |
| Potassium stearate | 44 |
| Zinc stearate | 53 |
| Calcium laurate | 42 |
| Calcium stearate | 53 |
| Calcium azelate | 110 |
| Calcium benzoate | 103 |
| Calcium myristate | 68 |
| Calcium carbonate | 103 |
| Calcium phosphate | 110 |
| Calcium pelargonate | 124 |
| Calcium octoate | Pressure increase too high to run |

The above data indicates that sheets containing calcium azelate, calcium benzoate, calcium carbonate, calcium phosphate and calcium pelargonate all have a break point substantially higher than the break point of sheets containing the various other metal salt scavengers. However, as pointed out above, calcium azelate, calcium benzoate, calcium carbonate and calcium phosphate all have the drawback that they have a substantially higher melting point than calcium pelargonate and have a tendency to plug the screen pack of the extruder. Accordingly, the above data clearly shows that calcium pelargonate has substantially better water carry-over properties than various other aliphatic organic carboxylic acid salts.

EXAMPLE II

This example illustrates the use of various other divalent salts of pelargonic acid and the use of a coprecipitated mixture of calcium pelargonate and calcium stearate. Example I was repeated using 99.65 parts by weight of the hompolymeric polypropylene, 0.05 parts by weight of the halide scavenger, 0.1 part by weight butylated hydroxytoluene, 0.15 parts by weight 1,3,5-tris(3,5-di-t-butyl-4-hydroxybenzyl)-s-triazine-2,4,6-(1H,3H,5H)-trione and .05 parts by weight distearyl pentaerythritol diphosphite. The break speed of the sheets was as follow: zinc pelargonate 98 feet per minute, magnesium pelargonate 100 feet per minute, coprecipitated mixture of calcium pelargonate and calcium stearate 55 feet per minute and calcium stearate 46 feet per minute. The above data clearly shows the advantage of using divalent metal salts of pelargonic acid as the halide scavenger in order to improve the water carry-over properties of polypropylene ribbon films and also illustrates the deleterious effect of calcium stearate on coprecipitated calcium pelargonate.

We claim:

1. In the process of producing polypropylene films by extruding a resinous polymer of propylene into an aqueous quench bath the improvement which comprises using a resinous polymer of propylene having at least 75 percent by weight propylene containing a divalent salt of pelargonic acid as a halide scavenger, wherein said divalent metal salt comprises at least one member selected from the group consisting of barium, calcium, strontium, zinc and magnesium.

2. The process of claim 1 wherein said divalent salt is present in a concentration of from about 0.001 to 5 parts by weight per 100 parts by weight resinous polymer of propylene.

3. The process of claim 2 wherein said resinous polymer of propylene is a homopolymer.

4. The process of claim 2 wherein said divalent salt is an alkaline earth metal salt.

5. The process of claim 4 wherein said divalent salt is calcium.

6. The process of claim 2 wherein said divalent salt is zinc.

7. The process of claim 2 wherein said divalent salt is magnesium.

8. The process of claim 1 wherein said divalent salt is calcium.

* * * * *